United States Patent [19]

Priola et al.

[11] 4,107,417

[45] Aug. 15, 1978

[54] PROCESS FOR THE PRODUCTION OF POLYMERS AND COPOLYMERS OF ISOBUTYLENE

[75] Inventors: Aldo Priola; Sebastiano Cesca; Giuseppe Ferraris, all of San Donato Milanese, Italy

[73] Assignee: Snamprogetti, S.p.A., Milan, Italy

[21] Appl. No.: 503,600

[22] Filed: Sep. 6, 1974

Related U.S. Application Data

[63] Continuation of Ser. No. 307,498, Nov. 17, 1972, abandoned.

[30] Foreign Application Priority Data

Nov. 26, 1971 [IT] Italy .................................. 31726 A/71

[51] Int. Cl.² .......................... C08F 4/64; C08F 4/60; C08F 210/12; C08F 236/04
[52] U.S. Cl. .................................... 526/117; 526/118; 526/120; 526/159; 526/160; 526/166; 526/169.1; 526/339
[58] Field of Search ................... 260/85.3 R; 526/117, 526/118, 120, 159, 160, 166, 169.1, 339

[56] References Cited

U.S. PATENT DOCUMENTS

| | | | |
|---|---|---|---|
| 3,493,549 | 2/1970 | Uemura et al. | 260/85.3 R |
| 3,631,013 | 12/1971 | Horie | 260/85.3 R |
| 3,850,896 | 11/1974 | Priola et al. | 260/85.3 R |
| 3,850,897 | 11/1974 | Priola et al. | 260/85.3 R |

*Primary Examiner*—Alan Holler
*Attorney, Agent, or Firm*—Ralph M. Watson

[57] ABSTRACT

A process is described whereby homopolymers and copolymers of isobutylene are prepared by effecting the polymerization at a temperature in the range of −100° to 30° C in the presence of a catalyst system including:

(a) a compound selected from the group consisting of: $AlCl_3$, $AlBr_3$, $AlEtCl_2$, $TiCl_4$, $SnCl_4$, $SiCl_4$, $VCl_4$, $BF_3$, $Al_2Et_3Cl_3$, $SbCl_5$, $SbF_5$, $FeCl_3$, $VOCl_3$, $ZrCl_4$, $AlI_3$, $GaCl_3$; and (b) a compound adapted to react with the compounds of group (a) and selected from the group consisting of: $SnR_4$, $SnRX_3$, $SrR_4$, $TiX_2(OR)_2$, $Ti(OR)_4$, $PbR_4$, $Ti(OR)X_3$, $VO(OR)_3$, $Ti(OR)_3X$, $(C_5H_5)_2Ti(C_6H_5)_2$, $(C_5H_5)_2Ti(CH_3)_2$, $Ti(Acac)_4$, $SnCl_2(acetate)_2$ in which R is a hydrocarbon radical with from 1 to 10 carbon atoms and X is a halogen atom.

The process is of particular value in the production of butyl rubber through the copolymerization of isobutylene and isoprene.

5 Claims, No Drawings

PROCESS FOR THE PRODUCTION OF POLYMERS AND COPOLYMERS OF ISOBUTYLENE

This ia a continuation of application Ser. No. 307,498, filed Nov. 17, 1972, now abandoned.

This invention relates to a procedure for the production of polymers and copolymers of isobutylene through the use of a particular catalyst system which enables us to utilize higher reaction temperatures than those previously used industrially, it also enables us to obtain higher yields in polymers having a higher molecular weight and generally better properties, logically dependent upon the operating conditions selected and other factors known to those skilled in the art.

More particularly, this invention relates to a procedure for the production of butyl rubber.

It is well known that butyl rubber is industrially produced by means of processes of co-polymerization achieved by utilizing cationic type initiators. In particular, the copolymerization is achieved by utilizing Al Cl$_3$ in ethyl chloride or in methyl chloride solution at $-100°$ C.

The use of a solid catalyst insoluble in common hydrocarbon solvents and only slightly soluble in chlorine containing solvents, has created many difficulties in the realization of an efficacious control of this reaction. The preparation of the catalyst solution itself is somewhat complex, and in general, it is realized by the passage of a current of ethyl chloride or methyl chloride on a bed of solid trichloride alluminium. Also the determination subsequently, of the concentration of the catalyst that is achieved through titration of the Al Cl$_3$ is very complex and often gives very unexpected results.

It is evident from the above, that recently there has been much effort on the part of various researchers and industries interested in the production of this type of rubber, towards the discovery of new catalyst systems that would simultaneously solve the problems of the dosage for the catalyst and permitting an increase in the temperature of the polymerization, without of course compromising the properties of the rubber and, in particular, without lowering the value of the molecular weight. Recently some researchers perfected a new soluble catalyst system that enables us to obtain butyl rubber with a high molecular weight at considerably higher temperatures than those normally used in industrial processes. The system in question is based upon a combination of a "modified" Friedel Crafts haloid, for example Al Et$_2$ Cl, with an appropriate co-catlyst. These haloids are not usually capable of initiating the polymerization of isobutylene by themselves, or in mixtures of isobutylene with dienes or other monomers that normally polymerize with a cationic type mechanism.

The polymerization or co-polymerization begins only when the co-catalyst is introduced. This co-catalyst may be composed of a substance able to produce protons, such as, for example H Cl and other Bronsted acids, or by a substance capable of supplying carbon ions, such as, for example, t-butyl chloride.

The same applicant owns a patent application pertaining to a procedure for the production of butyl rubber by means of the use of a catalyst system constituted by a reducing aluminum compound and by a co-catalyst capable of giving cations for interaction with the catalyst. The co-catalyst may be a halogen introduced as such, or other interhalogenic compounds. The process which has now been perfected by the applicant, and which constitutes the subject of this application, presents all the advantages of the catalyst systems mentioned previously and which are essentially characterized by considerable ease of the control of the polymerization reaction owing to the solubility of these catalysts in common organic solvents, so that whenever necessary it is possible to operate with minimum quantities of solvent, even in its total absence in which case, the same non-reacted monomer functions as diluent.

In respect to the processes using haloids of dialkyl alluminium and strong acids, it also has the advantage of obtaining products of equal or sometimes higher molecular weight and even higher reaction temperatures. It also has major regularity in the polymerization process, permitting, in fact, a major control of the temperature and therefore a higher regularity in the polymers produced.

Then in respect to the system using halogen or interhalogenic solutions, it has the great advantage of easier handling of the compounds used as catalysts. Besides, it has the advantage of major ease in dosing the co-catalyst, eventually greater economy compared to the co-catalysts constituted by alkyl haloids, especially in view of the high purity they must possess.

Although this application essentially concerns the production of butyl rubber, in view of the industrial interest in this, it will be easy for those skilled in the art, using the catalyst system described herein, to find the ideal conditions for the copolymerization of different monomers.

In particular, the usable monolefine may include from 4 to 7 carbon atoms ($C_4 \div C_7$), while the multiolefine is generally constituted by a diolefine conjugated with a number of carbon atoms ranging from 4 to 14 ($C_4 \div C_{14}$); such as isoprene, butadiene, 2,3 dimethyl 1.3 butadiene, while examples of the first may be isobutene 2-methyl butene 1, 3-methyl-butene-1 2 methyl-butene 2, 4-methyl-pentene-1.

As noted above, only great industrial interest has our examples to to limit his examples in the case of butyl rubber, that is, to the copolymerization of isobutylene and isoprene in quantities variable from 90 to 99.5 in isobutylene by weight and from 10 to 0.5% in isoprene by weight.

The reaction media used are those which are normally used in the technical field, i.e., ethyl chloride, methyl chloride, or methylene chloride. However, it is also possible to use hydrocarbon compositions that are liquid at the temperature of reaction, such as pentane, isopentane, n-heptane, cyclohexane or even solvents maintained in the liquid phase at the temperature of reaction, such as, for example, the monomer or the monomers used. The molecular weights of the product obtained vary over a considerable range according to the conditions adapted.

In the practice of our invention the copolymerization reaction is effected at a temperature in the range between $-100$ and $+30°$ C.

The catalyst systems usable in the process of this invention are constituted by haloids of Friedel-Crafts, which are made to react with compounds of other metals having the capacity to complex themselves or to react with the previously mentioned haloids.

Examples of Friedel-Crafts haloids that are usable according to this invention may be those which are Lewis acids, and especially those selected from among: Al Cl$_3$, Al Br$_3$, Al Et Cl$_2$, Ti Cl$_4$, Sn Cl$_4$, Si Cl$_4$, VCl$_4$, $BF_3$, $Al_2 Et_3 Cl_3$, $Sb Cl_5$, $Sb F_5$, $Fe Cl_3$, $VOCl_3$, $Zr Cl_4$, $Al I_3$, $Ga Cl_3$, and so on.

Examples of compositions capable of reacting with the above mentioned acids are found among the organometallic, alcoholated, organic salts, arenic compounds, and similar compounds of numerous metals or metalloids, which by themselves are totally inactive in the copolymerization of isobutene.

More especially, these latter compounds may be exemplified by $Sn R_4$, $Si R_4$, $Ti Cl_2 (OR)_2$, $Pb R_4$, $VO(OR)_3$, $(C_5H_5)_2 Ti (C_6H_6)_2$, $Ti (CH_3)_2(C_2H_5)_2$ $Ti (Aryl)_4$ and so on.

The catalyst may be obtained by interaction "in situ" of the two components, or it may be performed under very different conditions which are easily foreseen by those skilled in the art.

The molecular weights of the polymers prepared in the following examples were obtained through viscosimetric measures of polymer solutions in cyclohexane at 30° C. After having determined the intrinsic viscosity by extrapolation at $C = O$ of the curves $l\mu\eta e|e$ and $\eta_{sp|e}$ the average molecular weight of single polymers was calculated by the following equation $$l\mu\ M\mu = 11.98 + 1.452\ l\mu[\eta]$$

The invention will be more clearly comprehensible from a consideration of the following examples, to which, however, it should not be understood to be limited.

EXAMPLE 1

In a tubular reactor completely made of glass, having a capacity of 300 cm³, provided with a mechanical agitator and a thermometric sheath previously heated with flame under a dry Argon flow, and maintained during the execution of the experiment, under a slight overpressure of Argon (20 – 30 torr in respect to the athmospheric pressure), we condensed 80 cm³ of $CH_3Cl$, and then we introduced 28.4 g of isobutene, 0.84 g of isoprene bringing the temperature to −40° C by means of a thermostatic bath. In a separate balloon flask we introduced, operating in a dry Argon environment 5 cm³ of $CH_2 Cl_2$, then we added at room temperature 0.2 mmoles of $Ti(O-nC_4H_9) Cl_2$ and 0.3 mmoles of Al Et $Cl_2$. After five minutes the mixture obtained was cooled at 40° C and then slowly added to the reaction mixture over a period of 2 minutes for which we had a temperature increase 7° C.

After further shaking of the mass for 10 minutes, we obtained 16.50 of dry polymer (yield = 58.2%) which present a [η] determined in cyclohexane, equal to 1.95 dl/g which corresponds to an average viscosimetric M $\forall$ equal to 400,000 and a content of unsaturations determined iodometrically, corresponding to 2.5% in isoprene by weight.

The polymer obtained was subjected to vulcanization in split plates using a mixture of the following composition prepared on an open mixer with cylinders:

| | |
|---|---|
| Polymer | 100 parts |
| EPC black | 50 parts |
| Antioxidant 2246 | 1 part |
| ZnO | 5 parts |
| Stearic Acid | 3 parts |
| Sulphur | 2 parts |
| MB-TDS (Mercapto-benzothiazole-disulfide) | 0.5 parts |
| TMTD (Tetramethyl-thiurame-disulfide) | 1 part |

The mixture was vulcanized at 153° C for 40 and 60 minutes. The properties of the vulcanized products obtained are set forth in Table 1, in Table 2 we present for the sake of comparison, the properties of a commerical type of butyl rubber determined under the same conditions.

TABLE 1

| | | |
|---|---|---|
| Vulcanization time (minutes) | 40 | 60 |
| Modulus at 100% (Kg.cm²) | 15 | 16 |
| Modulus at 200% (Kg./cm²) | 27 | 29 |
| Modulus at 300% (Kg./cm²) | 48 | 53 |
| Breaking load (Kg./cm²) | 216 | 206 |
| Breaking length (%) | 710 | 650 |
| Permanent set (%) | 33 | 38 |

TABLE II

| | | |
|---|---|---|
| Vulcanization time (*) (minutes) | 40 | 60 |
| Modulus at 100% (Kg/cm²) | 15 | 16 |
| Modulus at 200% (Kg/cm²) | 27 | 33 |
| Modulus at 300% (Kg/cm²) | 47 | 58 |
| Breaking load (Kg/cm²) | 209 | 210 |
| Breaking length (%) | 715 | 650 |
| Permanent set (%) | 29 | 29 |

(*) Butyl rubber Enjay B 218 with a viscosimetric molecular weight equal to approximately 450,000 and contents of unsaturations equal to 2.15% in isoprene weight.

The above reported results show that the polymer obtained in this experiment, conducted at a temperature in the range between −33 and 40° C presents, after its vulcanization, properties equal to those of commercial butyl rubber, which as is well known, is produced at a temperature inferior to −100° C.

EXAMPLE 2

We operated under the same conditions and with the same quantities of reagents as described in the previous examples with the difference that the polymerization was initiated by Al Et $Cl_2$ by itself. We used 0.1 mmoles of Al Et $Cl_2$ for which we obtained 17.4g of dry polymer (yield = 61.3%) having [η] = 0.66 dl/g (PMv = 80,000), sticky and with properties completely unsatisfactory for any practical use.

EXAMPLE 3

We operated under the same conditions and with the same quantities of reagents as described in example 1 with the difference that we reacted at room temperature 0.2 mmoles of $VO(n. C_4H_9) Cl_2$ with 0.3 mmoles of Al Et $Cl_2$. We completed the addition of the catalyst solution in 8 minutes for which we had an increase in temperature of 4° C. in the reaction mixture. We obtained 21g of polymer (yield = 73.8%) having a [η] = 1.46 dl/g which corresponds to an average viscosimetric PM equal to 270,000 and an unsaturation content corresponding to 3.15% in isoprene by weight.

The polymer after having undergone vulcanization as described in example 1, presented properties similar to those reported in Table 1.

EXAMPLE 4

We operated as described in example 1 with the difference that we reacted at room temperature 0.25 mmoles of Ti $(O\ n\ C_4H_9)_3 Cl$ and 1.5 mmoles of Al Et $Cl_2$ in 5 cm³ of $CH_2Cl_2$.

The addition of the catalyst solution was carried out over a period of six minutes during which we had an increase in the temperature of the reaction mixture of 3° C. We obtained g 21.7 of dry polymer (Yield = 76.5%) having [η] equal to 1.40 dl/g (PM$_v$ = 250,000) and an unsaturation content equal to 2.75% in isoprene by weight and physical properties similar to those reported for the sample in example 1.

EXAMPLE 5

We operated under the same conditions and with the same quantities of reagents as described in Example 1 with the difference that we carried out the interaction between the components and the catalyst system "in situ" that is in the system of polymerization itself. In fact, in the polymerization reactor, after the introduction of the solvent and the monomers, we introduced 0.26 mmoles of Ti (O nC$_4$H$_9$) Cl$_3$, and then operating at a temperature of −40° C we slowly introduced under strong shaking 0.2 mmoles of Al Et Cl$_2$ dissolved in 5cc of CH$_3$ Cl for a period of six minutes during which we had a temperature increase 5° C. We obtained 14g of dry polymer (yield = 49%) having [η] equal to 1.09 dl/g (PMv = 160,000) and unsaturation contents equal to 2.5% in isoprene by weight.

EXAMPLE 6

We operated as described in example 1 with catalyst preformed at room temperature of environment, reacting 0.06 mmoles of Sn (Et)$_4$ with 0.06 mmoles of Al Et Cl$_2$ in 5 cc of CH$_2$ Cl$_2$.

The addition of the catalyst was carried out at −40° C over a period of eleven minutes during which we had a temperature increase in the amount of 4° C. We obtained 19.15g of dry polymer (Yield = 67.5% having [η] = 1.20 (PMv = 200,000) and unsaturation contents equal to 3.1% in isoprene by weight.

EXAMPLE 7

We operated as described in the previous example, reacting at room temperature 1 mmole of Pb(Et)$_4$ with 1.5 mmoles of Al Et Cl$_2$ in 5cc of CH$_2$Cl$_2$. The addition of the catalyst to the polymerization solution was carried out at −40° C over a period of 7 minutes for which we had an increase temperature of 1° C. We obtained 4.2 g of dry polymer (yield = 15%) having [η] = 1.10 dl/g (PMv = 180,000) and unsaturation contents equal to 2.1% in isoprene weight.

EXAMPLE 8

With the same methods reported in example 1 we introduced into the reactor the same quantities of solvent and monomers. The catalyst was preformed by reacting at room temperature 0.22 mmoles of Sn (Et)$_4$ with 0.11 mmoles of Al Cl$_3$ in 5cc of CH$_2$ Cl$_2$ for which we had the formation of a limpid solution.

The addition of the catalyst was carried out at −40° C over a period of 11 minutes for which we had an increase in temperature of 4° C. We obtained 18.4 g of dry polymer (yield = 65%) having [η] = 1.31 dl/g (PMv = 230,000) and unsaturation contents equal to 3.1% in isoprene by weight.

As a basis for comparison, we repeated the experiment using as a catalyst Al Cl$_3$ by itself dissolved in CH$_3$ Cl.

We obtained the formation of a polymer having [η] = 0.80 dl/g, (PMv = 110,000), sticky, and with totally unsatisfactory characteristics for practical use.

EXAMPLE 9

In the polymerization reactor we introduced as described in example 1, the solvent and the monomers in the same quantity, then we introduced 0.4 mmoles of Sn (C$_2$H$_5$) Cl$_3$ and we brought the temperature to −40° C. We then slowly added 0.4 mmoles of Ti Cl$_4$ dissolved 5cc of CH$_3$ Cl for the duration of three minutes, during which we had a temperature increase of 4° C. We obtained gr. 4.2 of dry polymer (yield = 15%) having [η] equal to 1.46 dl/g (PMv = 270,000) and unsaturation contents equal to 3.1% in isoprene by weight.

As a basis for comparison, we repeated the experiment using as a catalyst Ti Cl$_4$ alone dissolved in CH$_3$Cl.

We obtained the formation of a polymer having [η] = 1.10 dl/g (PMv = 175,000) and unsaturation contents equal to 2,8% in isoprene by weight.

EXAMPLES 10 – 13

Operating as described in Example 1, using the same quantities of monomers and solvents, we copolymerized isobutene and isoprene with different catalyst systems, which are reported in the following table III together with the results obtained.

TABLE III

| Cat. | Cocat. | Yields | PMv (cop. obtained) |
|---|---|---|---|
| 1) Al Br$_3$ 0.1mmoles | Sn Et$_4$ 0.2mmoles | 55 | 220,000 |
| 2) Al Br$_3$ 0.1mmoles | Sn Cl$_2$ (acetate) 0.2mmoles | 45 | 250,000 |
| 3) Al Et Br$_2$ 0.1mmoles | Sn Et$_2$ Cl$_2$ 0.2mmoles | 35 | 210,000 |
| 4) Al$_2$ Et$_3$ Cl$_3$ 0.2mmoles | TiCl$_2$(O-but)$_2$ 0.2mmoles | 55 | 180,000 |

We claim:

1. Process for the production of butyl rubber through the copolymerization of isobutylene and isoprene wherein the improvement comprises conducting the copolymerization reaction in the presence of a catalyst system consisting essentially of:
   (a) a compound selected from AlEtCl$_2$, TiCl$_4$, Al$_2$Et$_3$Cl$_3$, SbCl$_5$, FeCl$_3$, ZrCl$_4$, AlI$_3$, GaCl$_2$; and
   (b) a compound able to react with the above mentioned ones chosen from SrR$_4$, TiX$_2$(OR)$_2$, Ti(OR)$_4$, PbR$_4$, Ti(OR)X$_3$, Ti(OR)$_3$X, (C$_5$H$_5$)$_2$Ti(C$_6$H$_5$)$_2$, (C$_5$H$_5$)$_2$ Ti(CH$_3$)$_2$, Ti(Acac)$_4$, in which R is a hydrocarbon radical with from 1 to 10 carbon atoms; and X is an atom of halogen.

2. Process according to claim 1, wherein the polymerization reaction is effected in the presence of a reaction medium selected from aliphatic, aromatic, cycloaliphatic, mono and polyhalogenated hydrocarbons.

3. Process according to claim 2, wherein the reaction medium is selected from methyl chloride and methylene chloride.

4. Process according to claim 1, wherein the reaction of copolymerization is effected at a temperature in the range between −100 and +30° C.

5. Process according to claim 1, wherein the mixture of isobutylene and isoprene is fed to the zone of reaction in quantities varying from 90 to 99.5% of isobutylene by weight and 10 to 0.5% of isoprene by weight.

* * * * *